(12) United States Patent
Fukuoka et al.

(10) Patent No.: US 6,334,027 B1
(45) Date of Patent: Dec. 25, 2001

(54) ELECTRONIC STILL CAMERA

(75) Inventors: Hiroki Fukuoka, Yokohama; Katsuhiko Manabe, Machida, both of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/722,325

(22) Filed: Nov. 28, 2000

Related U.S. Application Data

(62) Division of application No. 09/334,265, filed on Jun. 16, 1999, now Pat. No. 6,212,331, which is a division of application No. 09/010,997, filed on Jan. 22, 1998, now Pat. No. 5,960,155, which is a continuation of application No. 08/287,599, filed on Aug. 8, 1994, now abandoned.

(51) Int. Cl.[7] .......................... H04N 5/928; H04N 5/77; H04N 5/765

(52) U.S. Cl. .......................... 386/117; 386/107; 386/104

(58) Field of Search .................................. 386/117, 107, 386/104, 96, 109, 111, 112, 98, 46, 105, 106, 124, 125, 54, 38, 27, 33, 40, 45, 1, 39; H04N 5/928, 5/77, 5/765

(56) References Cited

U.S. PATENT DOCUMENTS

| Re. 36,338 | 10/1999 | Fujuoka . |
| 4,489,351 | 12/1984 | d'Alayer de Costemore d'Arc . |
| 4,777,537 | 10/1988 | Ueno et al. . |
| 5,153,730 | * 10/1992 | Nagasaki et al. ............. 386/107 |
| 5,289,277 | 2/1994 | Blanchard et al. . |
| 5,436,657 | 7/1995 | Fukuoka . |
| 5,960,155 | 9/1999 | Fukuoka . |
| 6,104,430 | 8/2000 | Fukuoka . |

* cited by examiner

*Primary Examiner*—Robert Chevalier
(74) *Attorney, Agent, or Firm*—Oblon, Spivak, McClelland, Maier & Neustadt, P.C.

(57) ABSTRACT

An electronic still camera which photographs an object and outputs image data. An image data coding device codes the image data. The coded image data is recorded to a recording medium. Sound data can also be converted to an electric signal and the sound data can be coded, converted to an electric signal, and then recorded to the recording media. A rearrangeable unused region of the recording media can be used as a work area for a file control work.

12 Claims, 11 Drawing Sheets

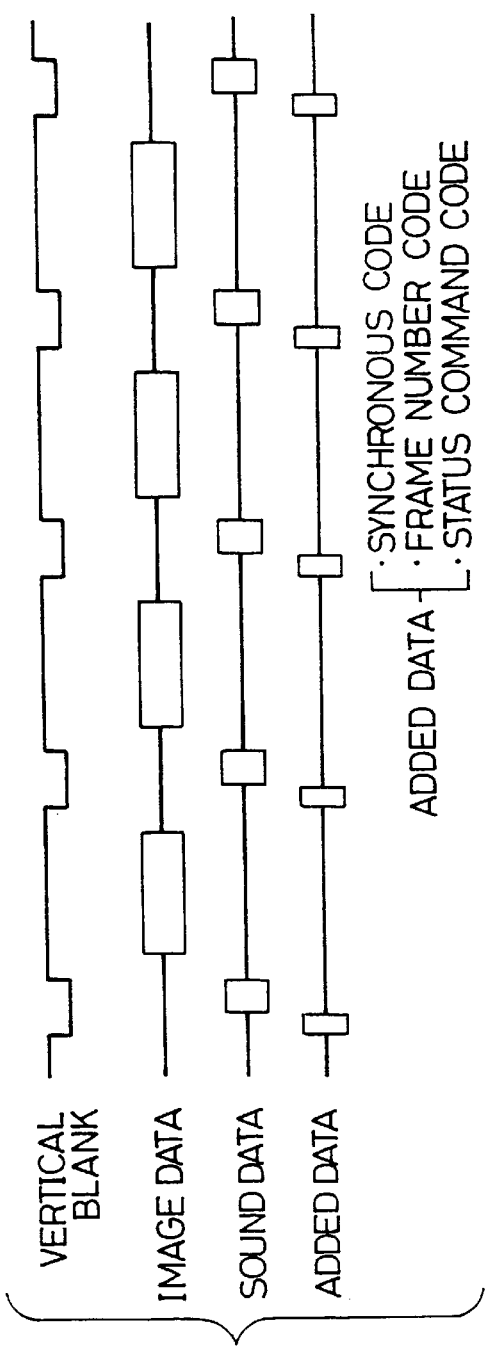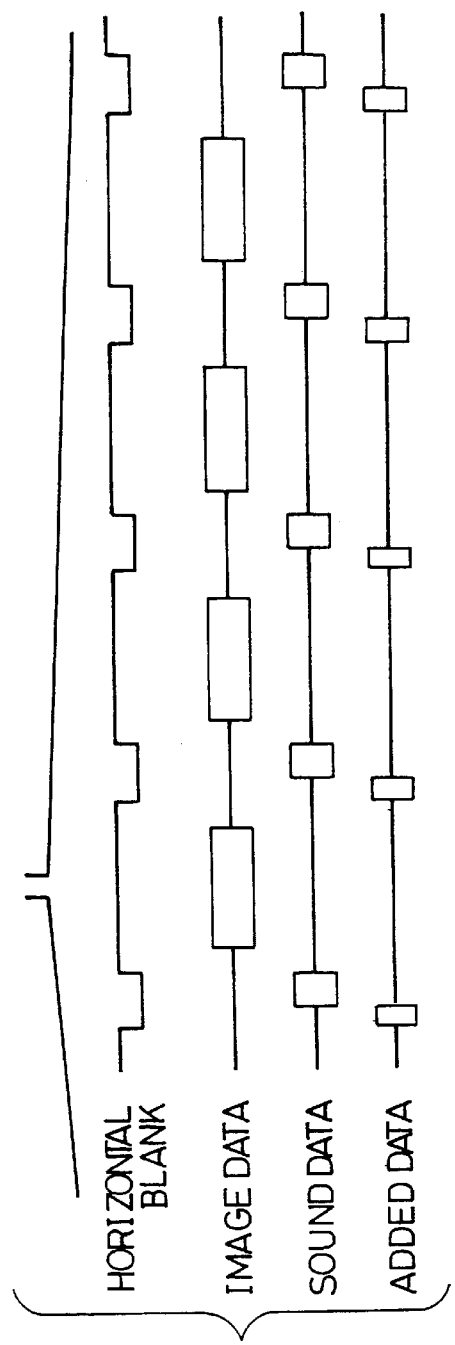

ELECTRONIC STILL CAMERA

This application is a Division of application Ser. No. 09/334,265 Filed on Jun. 16, 1999, now allowed U.S. Pat. No. 6,212,331; which is a Divisional of application Ser. No. 09/010,997, Filed on Jan. 22, 1998, now U.S. Pat. No. 5,960,155; which is a Continuation of Ser. No. 08/287,599, Filed on Aug. 8, 1994, now abandoned.

BACKGROUND OF THE INVENTION

1. Field of the Invention

The present invention relates to an electronic still camera capable of recording and regenerating information from a recording medium by coding and decoding image data and sound data relative to a photographed image.

2. Description of the Related Art

Japanese Patent Application Laying Open (KOKAI) No. 2-280484 shows an electronic still camera capable of recording and regenerating a picture image and a sound. As shown in this camera, a sound is stored to a sound memory while a continuous photographing mode is set and a continuous photographing operation is performed. The stored sound is recorded to a recording medium such that this sound corresponds to a picture image continuously photographed. The continuously photographed picture image and the sound during the continuous photographing operation are simultaneously regenerated from the recording medium so that an atmosphere at a photographing time can be sufficiently reproduced in this regeneration.

In this electronic still camera, a regenerated image such as a moving picture image can be obtained by continuously performing the photographing operation at a high speed. For example, an NTSC signal is obtained if a field image is recorded and regenerated every 1/60 second. When an image is recorded to the recording medium, it is necessary to take measures for recording sound data to the recording medium in synchronization with image data.

For example, the recording medium used for the electronic still camera is constructed by a memory card. A memory region of this memory card is divided into plural memory units each having a predetermined memory capacity such that images having plural kinds of image sizes are efficiently stored to the memory card.

For example, Japanese Patent Application Laying Open (KOKAI) No. 3-187690 shows an apparatus for recording and regenerating an image so as to increase recording and regenerating speeds of data recorded and regenerated from the memory card used for the electronic still camera. In this apparatus, a central processing unit (CPU) designates a top address in a first memory unit when all plural memory units having image data to be written or read from the memory card are continued. Thereafter, an address is designated by sequentially incrementing the top address by an address register arranged within the memory card. A switching operation of the memory units normally performed is omitted by stopping operations of an address generator and a data counter by the central processing unit (CPU). Thus, when all the plural memory units having image data to be written or read from the memory card are continued, the image data can be written or read from the memory card at a high speed.

In the above image recording-regenerating apparatus, when the image data as a file are recorded to the memory card and are regenerated from the memory card, it is necessary to read and write the image data by the central processing unit (CPU) using software. Accordingly, a processing time of the image recording-regenerating apparatus is increased so that no moving image can be recorded and regenerated in real time.

In the electronic still camera, when an image is recorded to the memory card as a recording medium, it is necessary to take measures for recording sound data and image data to the recording medium at a high speed.

Japanese Patent Application Laying Open (KOKAI) No. 3-265287 shows an electronic still camera device. In this electronic still camera device, a semiconductor memory has a region for recording information indicative of an empty unit recording region to be first recorded when image data are recorded. Thus, the empty unit recording region is retrieved for a short time.

However, when data are recorded in this electronic still camera device, a central processing unit (CPU) must write header information by using software. Therefore, a processing time of the central processing unit (CPU) is increased and no moving image can be recorded to the recording medium in real time.

The electronic still camera is mainly used at present as a device for inputting image and sound data to an information equipment. For example, Japanese Patent Application Laying Open (KOKAI) No. 4-212582 proposes a technique for directly inputting image data of an electronic camera to a personal computer and performing an editing operation of the image data, etc. without using any adapter, etc.

However, no adaptability (or affinity) between the present electronic still camera and the information equipment is good. Accordingly, it is necessary to use hardware and software for an interface (I/F).

The following problems are concretely caused.

(1) Image formats used for the information equipment are different from each other in accordance with application programs. When no format of an image file recorded by the electronic still camera is suitable for an application, it is necessary to make a program for converting the file format.

(2) The electronic still camera of a standard type is designed such that an image is regenerated and seen on the screen of a television such as NTSC, etc. Accordingly, no aspect ratio of a pixel is equal to "1". Therefore, when such a recorded file is regenerated by the information equipment such as a personal computer as it is, an image of the recorded file is defaced and is not clearly displayed.

(3) When image data are directly transferred to the information equipment through a recording medium interface (I/F), no image data can be normally displayed on a side of the information equipment when no synchronous position of the image data is transferred to the information equipment.

SUMMARY OF THE INVENTION

It is therefore a first object of the present invention to provide an electronic still camera in which a moving image and a sound can be recorded and regenerated in real time without increasing a memory capacity.

A second object of the present invention is to provide an electronic still camera capable of recording and regenerating image data and sound data with respect to a recording medium in real time.

A third object of the present invention is to provide an electronic still camera optimized to input multimedia information such as an image and a sound to an information equipment and having excellent cost performance.

In accordance with a first construction of the present invention, the above first object can be achieved by an electronic still camera comprising photographing means for photographing a photographed object and outputting image data; image data coding means for coding the image data; means for recording the coded image data to a recording medium; means for converting a sound to an electric signal; sound data coding means for coding sound data converted to the electric signal; means for recording the coded sound data to the recording medium; means for temporarily recording the coded image data from the image data coding means to a first-in first-out memory as a FIFO memory; means for DMA-transferring data within the FIFO memory to the recording medium where DAM is direct memory access; means for DMA-transferring the coded image data from the recording medium to the FIFO memory; and means for reading data from the FIFO memory to image data decoding means.

In accordance with a second construction of the present invention, the data within the FIFO memory are DMA-transferred for a period except for a vertical blanking period.

In accordance with a third construction of the present invention, a capacity of the FIFO memory is set to a capacity integer times that of the image data coded for one field period or one frame period.

In accordance with a fourth construction of the present invention, an interruption signal relative to completion of the DMA-transfer by a predetermined number of data is outputted from the DMA-transfer means to control means for controlling operations of the respective means.

In accordance with a fifth construction of the present invention, the above first object can be also achieved by an electronic still camera comprising photographing means for photographing a photographed object and outputting image data; image data coding means for coding the image data; means for recording the coded image data to a recording medium; means for converting a sound to an electric signal; sound data coding means for coding sound data converted to the electric signal; means for recording the coded sound data to the recording medium; means for temporarily recording the coded sound data from the sound data coding means to a first-in first-out memory as a FIFO memory; means for DMA-transferring data within the FIFO memory to the recording medium where DAM is direct memory access; means for DMA-transferring the coded sound data from the recording medium to the FIFO memory; and means for reading data from the FIFO memory to image data decoding means.

In accordance with a sixth construction of the present invention, the data within the FIFO memory are DMA-transferred for a vertical blanking period.

In accordance with a seventh construction of the present invention, a capacity of the FIFO memory is set to a capacity corresponding to the sound data coded for one field period or one frame period.

In accordance with an eighth construction of the present invention, an interruption signal relative to completion of the DMA-transfer by a predetermined number of data is outputted from the DMA-transfer means to control means for controlling operations of the respective means.

In accordance with a ninth construction of the present invention, the above first object can be also achieved by an electronic still camera comprising photographing means for photographing a photographed object and outputting image data; image data coding means for coding the image data; means for recording the coded image data to a recording medium; means for converting a sound to an electric signal; sound data coding means for coding sound data converted to the electric signal; and means for recording the coded sound data to the recording medium; the electronic still camera being constructed such that an address bus and a data bus of memory means used as a work area are respectively common to an address bus and a data bus of an interface with the recording medium.

In accordance with a tenth construction of the present invention, control signals can be simultaneously outputted by setting one bus to a bus for reading and the other bus to a bus for writing in control of the common address and data buses.

In accordance with an eleventh construction of the present invention, the above first object can be also achieved by an electronic still camera comprising photographing means for photographing a photographed object and outputting image data; image data coding means for coding the image data; means for recording the coded image data to a recording medium; means for converting a sound to an electric signal; sound data coding means for coding sound data converted to the electric signal; and means for recording the coded sound data to the recording medium; the electronic still camera being constructed such that means for detecting an insertion/extraction detecting signal of the recording medium, a busy signal of the recording medium, or a signal indicative of a reduction in voltage of a battery of the recording medium outputs an interruption signal relative to each of these signals to control means for controlling operations of the respective means.

In accordance with a twelfth construction of the present invention, the above first object can be also achieved by an electronic still camera comprising photographing means for photographing a photographed object and outputting image data; image data coding means for coding the image data; means for recording the coded image data to a recording medium; means for converting a sound to an electric signal; sound data coding means for coding sound data converted to the electric signal; means for recording the coded sound data to the recording medium; and means for extending a pulse width of a memory control signal for DMA-transfer by an outputting period of a weight signal when this weight signal is outputted from the recording medium in a DMA-transfer state of data transmitted to the recording medium where DMA is direct memory access; the extending means outputting the weight signal to control means for controlling operations of the respective means in a state in which no data are DMA-transferred.

In accordance with a thirteenth construction of the present invention, the above first object can be also achieved by an electronic still camera comprising photographing means for photographing a photographed object and outputting image data; image data coding means for coding the image data; means for recording the coded image data to a recording medium; means for converting a sound to an electric signal; sound data coding means for coding sound data converted to the electric signal; means for recording the coded sound data to the recording medium; and common reading and writing registers for getting access to a first-in first-out memory as a FIFO memory or a work memory seen from control means for controlling operations of the respective means; these registers being arranged at continuous addresses.

In accordance with a fourteenth construction of the present invention, the above first object can be also achieved by an electronic still camera comprising photographing means for photographing a photographed object and outputting image data; image data coding means for coding the image data; means for recording the coded image data to a recording medium; means for converting a sound to an electric signal; sound data coding means for coding sound data converted to the electric signal; means for recording the coded sound data to the recording medium; transfer means for transferring 16 bit data to the recording medium by exchanging high and low order bytes of these 16 bit data with each other; and control means for selecting whether this transfer means is used or not.

In accordance with a fifteenth construction of the present invention, the above first object can be also achieved by an electronic still camera comprising photographing means for photographing a photographed object and outputting image data; image data coding means for coding the image data; means for recording the coded image data to a recording medium; means for converting a sound to an electric signal; sound data coding means for coding sound data converted to the electric signal; means for recording the coded sound data to the recording medium; a register for storing address data outputted to the recording medium; and control means for selecting whether registered contents of this register are incremented by the number of transferred data or not.

In accordance with a sixteenth construction of the present invention, the above first object can be also achieved by an electronic still camera comprising photographing means for photographing a photographed object and outputting image data; image data coding means for coding the image data; means for recording the coded image data to a recording medium; means for converting a sound to an electric signal; sound data coding means for coding sound data converted to the electric signal; means for recording the coded sound data to the recording medium; a register for controlling operations of plural power sources providing outputs to the recording medium; and control means for setting registered contents of this register on the basis of a kind and a control mode of the recording medium.

As mentioned above, in accordance with each of the first and fifth constructions of the electronic still camera in the present invention, image data and sound data are recorded and regenerated with respect to a memory card as a recording medium by a first-in first-out (FIFO) memory and a DMA(direct memory access)-transfer means. Accordingly, a data transfer time is reduced and a moving image and a sound are recorded and regenerated in real time in comparison with a case in which the image data and the sound data are recorded and regenerated with respect to the memory card by using software.

In accordance with each of the second and sixth constructions of the electronic still camera in the present invention, data within the FIFO memory are DMA-transferred for a period except for a vertical blanking period. Further, sound data are DMA-transferred for the vertical blanking period. Accordingly, a file can be easily controlled every field.

In accordance with the third construction of the present invention, a capacity of the FIFO memory for an image is set to a capacity integer times that of the image data coded for one field period or one frame period. Accordingly, data can be easily processed when these data are set to a file every one field or one frame. Therefore, a continuous image can be recorded even when a memory card having a low writing speed is used. Further, no capacity of the FIFO memory is excessively increased.

In accordance with each of the fourth and eighth constructions of the present invention, completion of the DMA-transfer by a predetermined number of data relative to an image or a sound is transmitted to control means for controlling each of operations of the constructional means of the camera by using an interruption signal. Accordingly, another control operation of the camera can be performed during the DMA-transfer.

In accordance with the seventh construction of the present invention, a capacity of the FIFO memory for a sound is set to a capacity corresponding to the sound data coded for one field period or one frame period. Accordingly, the capacity of the FIFO memory is set to a suitable value.

In accordance with the ninth construction of the present invention, an address bus and a data bus of a memory such as a SRAM used as a work area are respectively common to an address bus and a data bus of a memory card interface (I/F). Accordingly, the number of pins of a control integrated circuit (IC) can be reduced.

In accordance with the tenth construction of the present invention, control signals can be simultaneously outputted by setting one bus to a bus for reading and the other bus to a bus for writing in control of the common address and data buses. Accordingly, data can be transferred at one access time. Therefore, data can be transferred at a high speed between a work memory and the memory card as a recording medium.

In accordance with the eleventh construction of the present invention, when an insertion/extraction detecting signal of the memory card, a busy signal of the memory card, or a signal indicative of a reduction in voltage of a battery of the memory card is detected, this detection is transmitted to control means by using an interruption signal. Therefore, it is not necessary for the control means to perform polling processing so that the control means can be devoted to another processing. When an obstacle is caused, measures for this obstacle can be rapidly taken so that a generating probability of defects such as data destruction, etc. within the memory card can be reduced.

In accordance with the twelfth construction of the present invention, when a wait signal is outputted from the memory card in a DMA-transfer mode, a pulse width of each of memory control signals for the DMA-transfer is extended for an outputting period of the wait signal. Accordingly, data can be normally transferred to a memory card on which a device having a low operating speed is mounted. In contrast to this, when no DMA-transfer mode is set, the wait signal is outputted to the control means. Therefore, an access operation is normally performed even when the control means directly gets access to data of the memory card.

In accordance with the thirteenth construction of the present invention, the electronic still camera has common reading and writing registers for getting access to various kinds of memories such as a first-in first-out (FIFO) memory or a work memory seen from control means. Accordingly, when the control means gets access to these memories, no operations for incrementing and decrementing addresses are performed. Therefore, a program capacity can be reduced and a high speed access operation can be simultaneously performed. Further, these registers are arranged at continuous addresses so that data can be accessed between the memories by using only address incremental commands.

In accordance with the fourteenth construction of the present invention, the electronic still camera has a means for transferring 16 bit data to the memory card by exchanging high and low order bytes of these 16 bit data with each other when these data are transferred between the memory card and a control section of the camera. Accordingly, a program capacity for this exchange can be reduced and a processing speed of the electronic still camera can be increased. Further, the high and low order bytes can be exchanged by control means so that optimum control can be performed in accordance with a data kind.

In accordance with the fifteenth construction of the present invention, the electronic still camera has a register for storing address data outputted to the memory card. It is not necessary to increment an address outputted to the memory card every time data are read and written. Accordingly, a program capacity of a ROM in the control means can be reduced and a processing speed of the electronic still camera can be increased. When it is not necessary to increment an address, a functional selection can be made by the control means so that no problem is caused.

In accordance with the sixteenth construction of the present invention, the electronic still camera has a register for controlling operations of plural power sources providing outputs to the memory card. Registered contents of this register are set from the control means by a kind and a control mode of the memory card. Accordingly, a voltage of each of the power sources optimum for the kind and the control mode of the memory card can be controlled in accordance with a device kind recorded to the memory card.

In accordance with a seventeenth construction of the present invention, the above second object can be achieved by an electronic still camera comprising photographing means for photographing a photographed object and outputting image data; image data coding means for coding the image data; means for recording the coded image data to a recording medium; means for converting a sound to an electric signal; means for coding sound data converted to the electric signal; means for recording the coded sound data to the recording medium; means for storing file header information of the image data or the sound data to a memory in advance; and direct memory transfer means; the file header information being recorded to the recording medium.

In accordance with an eighteenth construction of the present invention, the file header information includes a Huffman table used at a coding time.

In accordance with a nineteenth construction of the present invention, the electronic still camera further comprises means for making a control information file in which information relative to an image file, a sound file or a character information file is recorded to the recording medium; and a directory entry number is used in control of the control information file.

In accordance with a twentieth construction of the present invention, the above second object can be also achieved by an electronic still camera comprising photographing means for photographing a photographed object and outputting image data; image data coding means for coding the image data; means for recording the coded image data to a recording medium; means for converting a sound to an electric signal; means for coding sound data converted to the electric signal; and means for recording the coded sound data to the recording medium; an unused region of the recording medium being used as a work area for a file control work.

In accordance with a twenty-first construction of the present invention, empty cluster information corresponding to a capacity of the image and sound data to be recorded is stored to the work area for the file control work in the recording medium when a recording mode is set or a release switch is pushed.

In accordance with a twenty-second construction of the present invention, internal data of the recording medium are rearranged such that a continuous required cluster can be secured when no continuous cluster corresponding to a capacity of continuous image and sound data to be recorded can be secured.

In accordance with a twenty-third construction of the present invention, when no internal data of the recording medium can be rearranged, such contents are alarmed.

In accordance with a twenty-fourth construction of the present invention, the above second object can be also achieved by an electronic still camera comprising means for reading coded image data from a recording medium; image data decoding means for decoding the read image data; means for reading coded sound data from the recording medium; and means for decoding the read sound data; the electronic still camera being constructed such that Huffman tables are searched with respect to all files designated in regeneration when a continuous image regenerating mode is set or a release switch is pushed; and the electronic still camera gives an alarm in which no data can be regenerated in real time when no Huffman tables are equal to each other.

In accordance with a twenty-fifth construction of the present invention, the above second object can be also achieved by an electronic still camera comprising means for reading coded image data from a recording medium; image data decoding means for decoding the read image data; means for reading coded sound data from the recording medium; and means for decoding the read sound data; the electronic still camera being constructed such that Huffman tables are searched with respect to all files designated in regeneration when a continuous image regenerating mode is set or a release switch is pushed; and a Huffman table of each of images developed prior to the regeneration is made within an unused region of the recording medium when no Huffman tables are equal to each other.

In accordance with the electronic still camera having the seventeenth construction of the present invention, file header information of image and sound data is stored to a memory constructed by a RAM or a ROM in advance. The file header information is recorded to the recording medium such as a memory card by the direct memory transfer means so that a processing time of these data is reduced.

In accordance with the eighteenth construction of the present invention, the image data are set to a JPEG file by using a Huffman table so that a moving image can be recorded to the recording medium at a high speed.

In accordance with the nineteenth construction of the present invention, a directory entry number is used instead of a file name in control of an image file, a sound file and a character information file so that a retrieving operation can be performed at a high speed.

In accordance with the twentieth construction of the present invention, it is not necessary to arrange a RAM having a large capacity within the electronic still camera by using an unused region of the recording medium as a work area for a file control work.

In accordance with the twenty-first construction of the present invention, when a recording mode is set or a release switch is pushed, empty of a cluster is retrieved in the recording medium in accordance with a capacity of the image and sound data to be recorded so that these data can be immediately recorded to the recording medium.

In accordance with the twenty-second construction of the present invention, internal data of the recording medium are rearranged such that a continuous required cluster can be secured. Thus, execution efficiency of an operating system is improved.

In accordance with the twenty-third construction of the present invention, there is a case in which no data can be recorded to the recording medium when no internal data of the recording medium can be rearranged and there is no continuous cluster. In this case, this unrecordable state is alarmed to a user so that errors in recognition and use can be prevented.

In accordance with the twenty-fourth construction of the present invention, no data can be regenerated in real time when a continuous file is regenerated and Huffman tables are different from each other every regenerated file. Accordingly, when no Huffman tables are equal to each other, this unequal state is alarmed so that errors in recognition and use are prevented.

In accordance with the twenty-fifth construction of the present invention, when no Huffman tables are equal to each other at a regenerating time of a continuous file, a Huffman table of each of images developed prior to the regeneration can be made in advance within an unused region of the recording medium. Accordingly, the Huffman table can be efficiently developed and data can be rapidly regenerated from the recording medium.

In accordance with a twenty-sixth construction of the present invention, the above third object can be achieved by an electronic still camera comprising photographing means for photographing a photographed object and outputting image data; image data coding means for coding the image data; means for recording the coded image data to a recording medium; means for converting a sound to an electric signal; means for coding sound data converted to the electric signal; means for recording the coded sound data to the recording medium; and means for selecting an image or sound format recorded to the recording medium.

In accordance with a twenty-seventh construction of the present invention, the above third object can be also achieved by an electronic still camera comprising photographing means for photographing a photographed object and outputting image data; image data coding means for coding the image data; means for recording the coded image data to a recording medium; and means for changing a pixel aspect ratio of the image data recorded to the recording medium.

In accordance with a twenty-eighth construction of the present invention, the above third object can be also achieved by an electronic still camera comprising photographing means for photographing a photographed object and outputting image data; image data coding means for coding the image data; means for recording the coded image data to a recording medium; means for converting a sound to an electric signal; means for coding sound data converted to the electric signal; means for recording the coded sound data to the recording medium; means for transferring incompressible image data to a recording medium interface section; and means for generating a code showing image synchronization and inserting this code into the incompressible image data.

In accordance with a twenty-ninth construction of the present invention, the incompressible image data transfer means has means for inserting sound data compressed in a time axis direction into the incompressible image data for an image blanking period.

In accordance with a thirtieth construction of the present invention, the incompressible image data transfer means has means for generating and inserting a code showing a field number or a frame number of an image into the incompressible image data for an image blanking period.

In accordance with a thirty-first construction of the present invention, the incompressible image data transfer means has means for generating and inserting status information and control commands transmitted to a device connected to the recording medium interface into the incompressible image data for an image blanking period.

In accordance with a thirty-second construction of the present invention, a transmitted data bus width in the incompressible image data transfer means is constructed by 16 bits composed of 8 bits for a brightness signal and the remaining 8 bits for a subsampled color difference signal.

In accordance with a thirty-third construction of the present invention, a transmitted data bus width in the incompressible image data transfer means is constructed by 16 bits composed of N bits for image data and the remaining bits for sound data where N is a positive integer.

As mentioned above, in accordance with the twenty-sixth construction of the present invention, the electronic still camera has means for selecting an image or sound format recorded to a memory card as a recording medium. Accordingly, when these formats are used in various kinds of application programs in an information equipment, no file conversion is required if data are recorded by the electronic still camera in accordance with the image and sound formats.

In accordance with the twenty-seventh construction of the present invention, the electronic still camera has means for changing a pixel aspect ratio of the image data recorded to the recording medium. Accordingly, when this aspect ratio is used in various kinds of application programs in the information equipment, no aspect conversion is required if data are recorded by the electronic still camera in accordance with the pixel aspect ratio.

In accordance with the twenty-eighth construction of the present invention, the electronic still camera has means for transferring incompressible image data to a recording medium interface section, and means for generating a code showing image synchronization and inserting this code into the incompressible image data. Accordingly, a synchronous position of the image data is known.

In accordance with the twenty-ninth construction of the present invention, the incompressible image data transfer means has means for inserting sound data compressed in a time axis direction into the incompressible image data for an image blanking period. Accordingly, the sound data can be also transferred in real time.

In accordance with the thirtieth construction of the present invention, the incompressible image data transfer means has means for generating and inserting a code showing a field number or a frame number of an image into the incompressible image data for the image blanking period. Accordingly, when an error in data transfer is caused, these data can be normally displayed immediately after this error is recovered.

In accordance with the thirty-first construction of the present invention, the incompressible image data transfer means has means for generating and inserting status information and control commands transmitted to a device connected to a recording medium interface into the incompressible image data for the image blanking period. The status information can be monitored on an information equipment side and an operation of the information equipment can be controlled.

In accordance with the thirty-second construction of the present invention, a transmitted data bus width is constructed by 16 bits composed of 8 bits for a brightness signal and the remaining 8 bits for a subsampled color difference signal. Accordingly, image data can be efficiently transmitted.

In accordance with the thirty-third construction of the present invention, a transmitted data bus width is constructed by 16 bits composed of N bits for image data and the remaining (16−N) bits for sound data where N is a positive integer. Accordingly, sound and image data can be transferred in real time.

Further objects and advantages of the present invention will be apparent from the following description of the preferred embodiments of the present invention as illustrated in the accompanying drawings.

BRIEF DESCRIPTION OF THE DRAWINGS

FIG. 11 is a flow chart for making a file in this embodiment; and each of

FIGS. 12a and 12b is a timing chart for transferring data to an information equipment.

DESCRIPTION OF THE PREFERRED EMBODIMENTS

The preferred embodiments of an electronic still camera in the present invention will next be described in detail with reference to the accompanying drawings.

Figure 1:
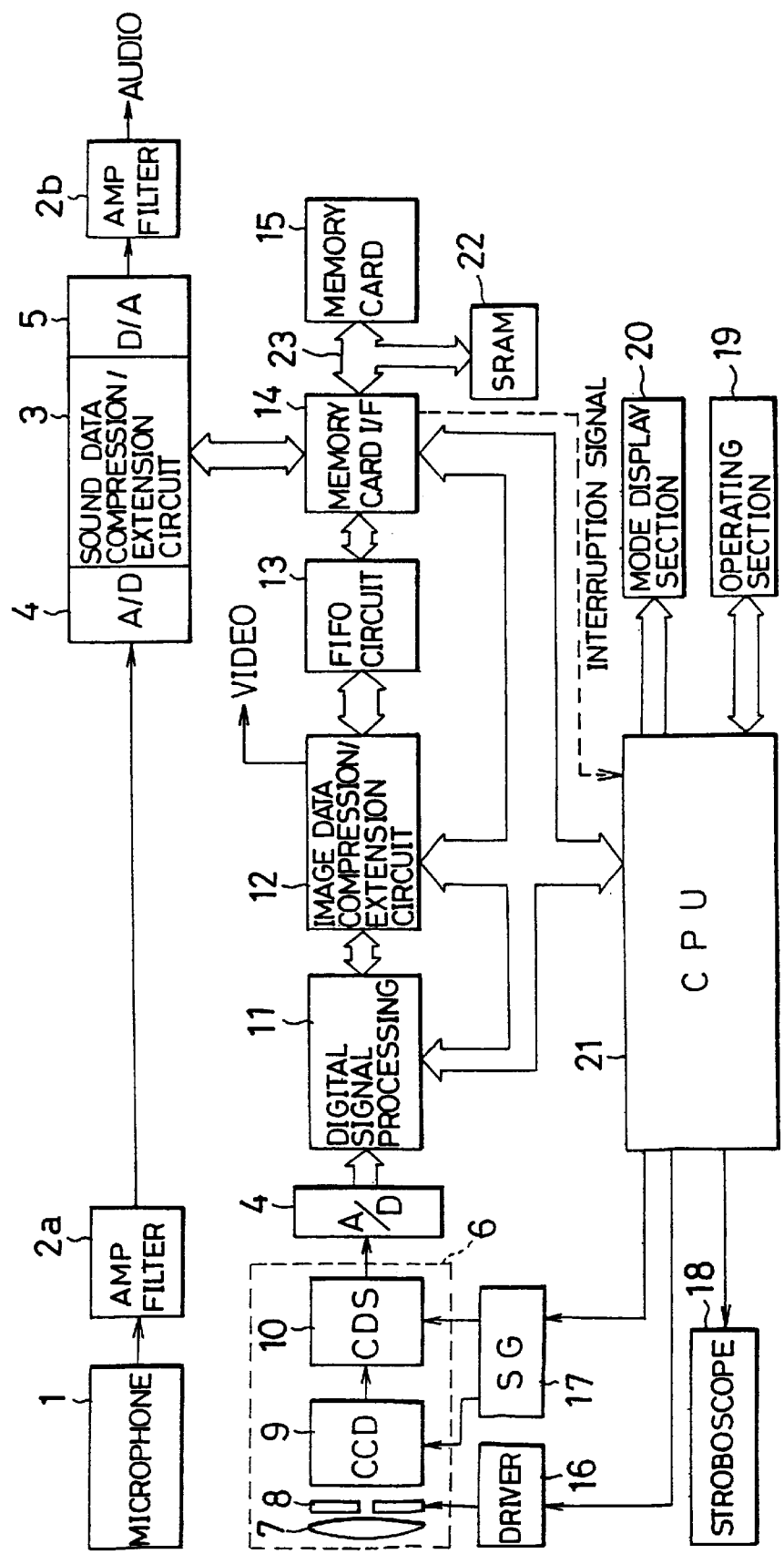
FIG. 1 is a block diagram showing the construction of an electronic still camera in accordance with one embodiment of the present invention.

FIG. 1 is a block diagram showing the construction of an electronic still camera in accordance with one embodiment of the present invention. Reference numerals 1, 2a and 2b respectively designate a microphone, an amplifier and an amplifier. A sound data compression/extension circuit 3 constitutes a sound data coding means and a sound data decoding means for respectively coding and decoding sound data. Reference numerals 4 and 5 respectively designate an analog/digital (A/D) converting circuit and a digital/analog (D/A) converting circuit.

An image pickup section 6 of the camera is constructed by an image pickup lens 7, a diaphragm 8, a charge coupled device (CCD) 9 and a CDS 10 as a camera control section, etc. A digital signal processing circuit 11 performs various kinds of image processings. An image data compression/extension circuit 12 constitutes an image data coding means and an image data decoding means for respectively coding and decoding image data. Reference numerals 13 and 14 respectively designate a first-in first-out (FIFO) circuit and a memory card interface (I/F) with a memory card 15.

A driver 16 constitutes a driving section of a mechanical system of the camera image pickup section 6. Reference numerals 17, 18 and 19 respectively designate a timing signal generating section (SG) of an electric system of the camera image pickup section 6, a stroboscope as an illuminating means, and an operating section for setting various kinds of operating modes. A mode display section 20 displays a set mode. A central processing unit (CPU) 21 controls an operation of each of the above constructional portions.

A SRAM 22 is used as a work area and has a bus structure common to an address-bus data-bus 23 connected to the memory card 15. Therefore, it is possible to reduce the number of pins of an integrated circuit (IC) for control and an area for mounting the integrated circuit, etc. Accordingly, the camera can be made compact and cheaply manufactured. Bus control signals are set to be independent of a bus control signal of the memory card. The SRAM 22 is constructed such that data read from the memory card 15 can be written to the SRAM 22 as they are.

In control of the above common address-bus data-bus 23, data can be transferred at one access time by simultaneously outputting control signals as a reading signal on one bus side and a writing signal on another bus side. Accordingly, data can be transferred between a work memory SRAM 22 and the memory card 15 at a high speed. For example, it is optimum to transfer data in a file control region such as FAT, a directory, etc.

Figure 2:
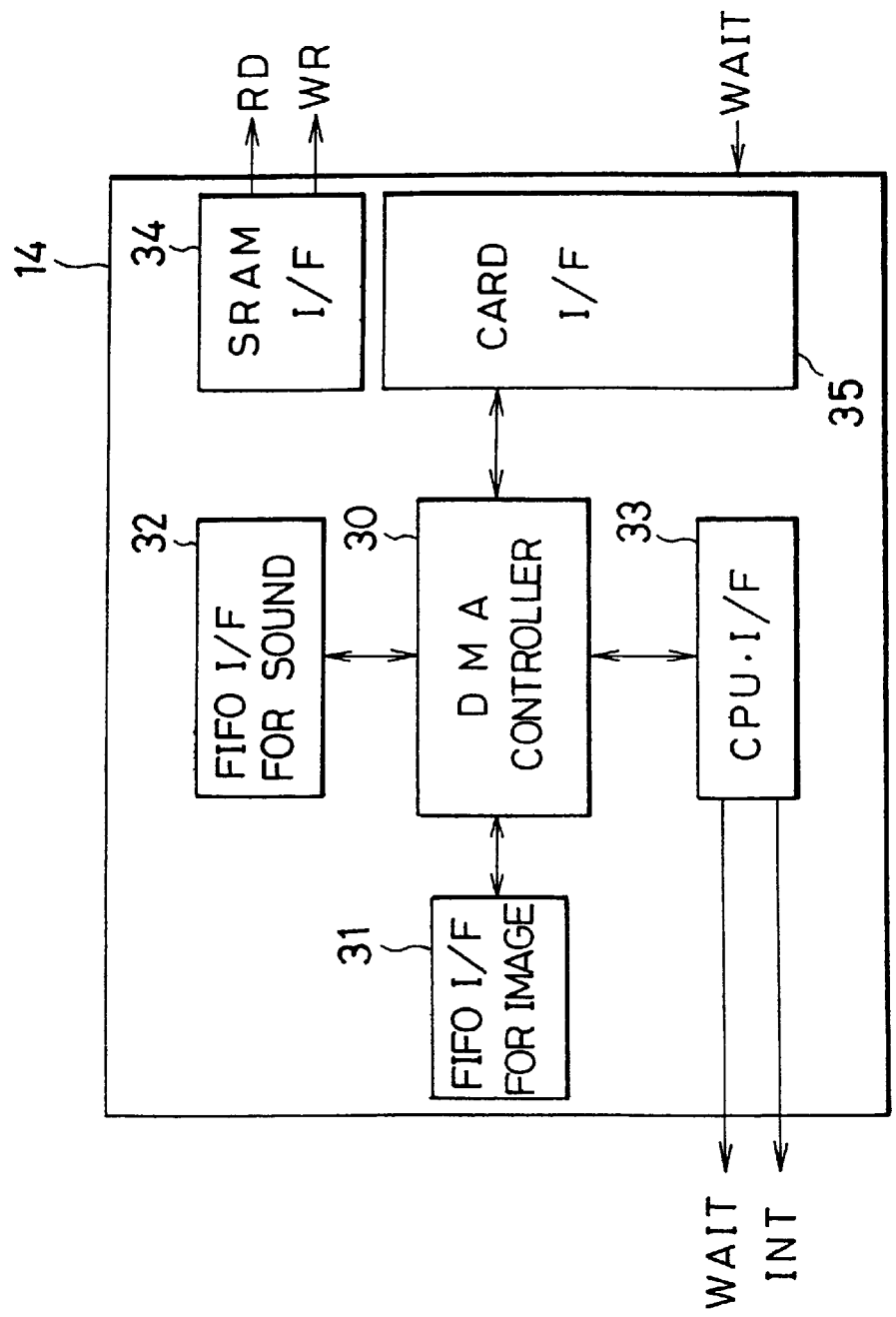
FIG. 2 is a block diagram showing the detailed construction of a memory card interface (I/F)

FIG. 2 is a block diagram showing the detailed construction of a memory card interface (I/F) shown in FIG. 1. Reference numerals 30, 31 and 32 respectively designate a DMA (direct memory access) controller, a first-in first-out (FIFO)-I/F for an image providing an interface with the FIFO circuit 13, a first-in first-out (FIFO)-I/F for a sound providing an interface with the FIFO circuit 13. A CPU-I/F 33 provides an interface with the central processing unit (CPU) 21. A SRAM-I/F 34 provides an interface with the SRAM 22. A card I/F 35 provides an interface with the memory card 15.

Image data and sound data recorded and coded to the FIFO circuit 13 are DMA-transferred and recorded to the memory card 15 by the DMA controller 30 through the memory card I/F 14. When the recorded data are regenerated, the image data are transferred in a reverse direction.

The number of DMA (direct memory access) transfers is set by the central processing unit (CPU) 21. After the DMA transfer has been completed, the DMA controller 30 outputs an interruption signal for informing the CPU 21 of the transfer completion. Therefore, another camera control can be processed during the DMA transfer.

The DMA controller 30 has a function for detecting an operating state of the memory card 15. Namely, the DMA controller 30 has a function for detecting whether the memory card 15 is mounted to a camera body or not. The DMA controller 30 also has a function for detecting a busy state of the memory card 15 and a function for detecting a reduction in voltage of a battery of the memory card 15. When such states are changed, an inserting/extracting signal of the memory card, a busy signal of the memory card, and a signal indicative of the reduction in voltage of the battery of the memory card are outputted to the central processing unit (CPU) 21 as interruption signals.

Thus, it is not necessary for the CPU 21 to perform polling processing by informing the CPU 21 of a change in state by using an interruption signal. Accordingly, the CPU 21 can be devoted to another processing. Further, when an obstacle is caused, measures for this obstacle can be rapidly taken so that a generating probability of defects such as data destruction, etc. within the memory card can be reduced.

When a wait signal is outputted from the memory card 15 in a DMA transfer mode, the DMA controller 30 extends each of memory control signals for the DMA transfer, i.e., read and write pulse widths for a weight signal period. The DMA controller 30 performs a control operation such that no signal is outputted to the CPU 21 and data are normally transferred to a memory card having a device having a low processing ability. In contrast to this, when no DMA transfer mode is set, the wait signal is outputted to the CPU 21 and the control operation of the DMA controller 30 is performed such that data of the memory card 15 can be normally accessed even when the CPU 21 directly gets access to the data of the memory card.

Various kinds of memories built in the memory card I/F 14 and connected to the exterior of the memory card I/F 14 are constructed such that data can be written and read from fixed address registers arranged within the memory card I/F 14. These registers are arranged at continuous addresses.

As mentioned above, the electronic still camera has read-write common registers for getting access to various kinds of first-in first-out (FIFO) memories and a work memory SRAM 22 seen from the CPU 21. Accordingly, when the CPU 21 gets access to these memories, no address incrementing/decrementing operation is required so that a program capacity can be reduced and a high speed access operation can be simultaneously performed. Further, since these registers are arranged at continuous addresses, data between the memories can be accessed by only address incremental commands.

Data of 16 bits (words) are transferred through the memory card I/F 14 and can be constructed such that high and low order bytes are exchanged by a setting operation of the CPU 21.

In the case of MS-DOS control, data in a file control region are recorded in a little endian byte order and it is necessary to map a least significant byte to byte 0 of each of the words. Further, when a central processing unit of a 680xx system is used as the CPU 21, data are processed in a big endian byte order so that it is necessary to exchange the high and low order bytes. However, in the present invention, it is not necessary to exchange the high and low order bytes so that a program capacity can be reduced and a processing speed of data can be increased. Further, the electronic still camera has a means for selecting such a function from the CPU 21. Accordingly, such a function can be released in the case of data of a JPEG header, etc. processed in the big endian byte order. Therefore, optimum control of the electronic still camera can be performed in accordance with data kinds.

The memory card I/F 14 has a register for storing address data outputted to the memory card 15. The memory card I/F 14 is constructed such that registered contents of this register can be incremented by the number of transferred data. This function can be selected by control of the CPU 21.

As mentioned above, the electronic still camera has a means for incrementing the registered contents by the number of transferred data, and a means which does not increment the registered contents by the number of transferred data. The electronic still camera further has a means for selecting each of these two means by the CPU 21. Accordingly, it is not necessary to increment an address outputted to the memory card 15 every time data are read and written. Therefore, a program capacity of a ROM of the CPU 21 can be reduced and a processing speed of the CPU 21 can be increased. There is a case in which no address increment is required in the case of control of a flash memory. In such a case, a functional selection can be also made by the CPU 21 so that no problem is caused.

Figure 3:
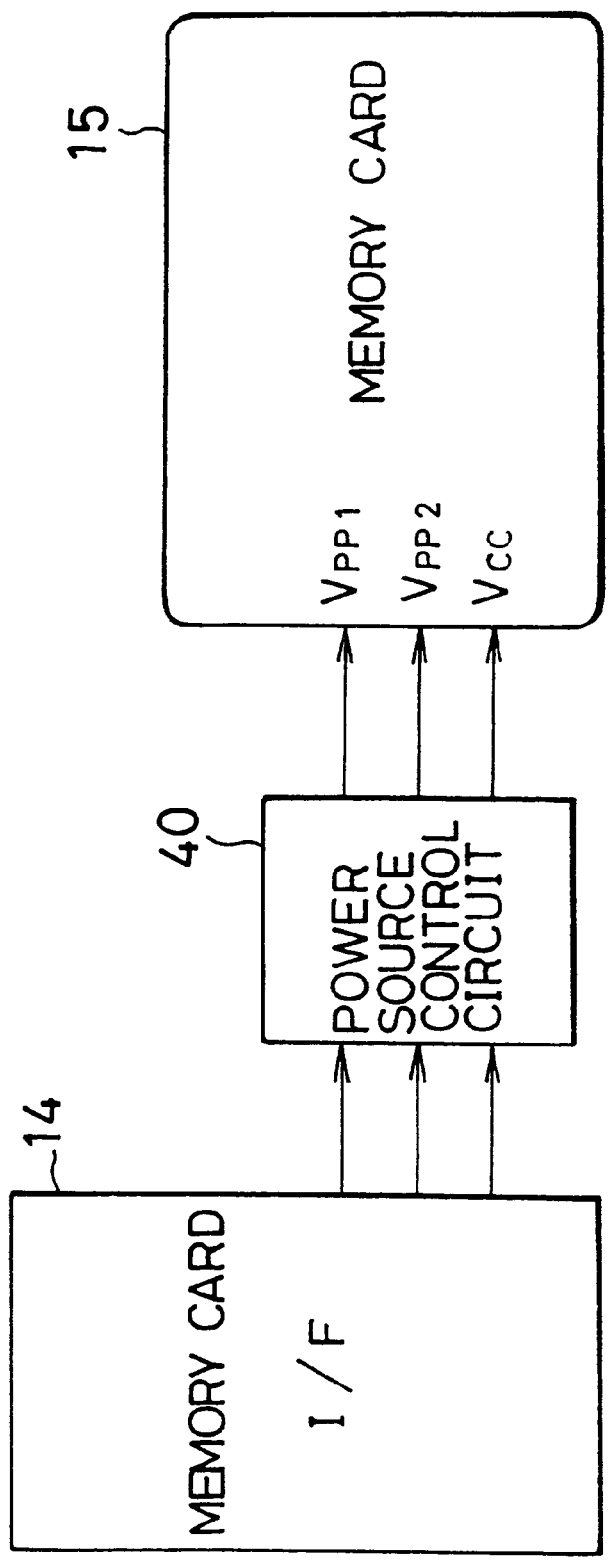
FIG. 3 is a view for explaining power source control of a memory card.

FIG. 3 is a view for explaining power source control of the memory card 15. The memory card I/F 14 has a register for controlling the output of a power source of the memory card 15. The CPU 21 gets access to this register so that a voltage of the power source of the memory card 15 can be outputted. Data of this output are transmitted to a power source control circuit 40 as a power source voltage output switching circuit 40 so that a set voltage is outputted to the memory card 15.

In such a construction, the electronic still camera has a register for controlling operations of plural power sources providing outputs to the memory card 15. Registered contents of this register can be set by kinds and control modes of the memory card from the CPU 21. A power source voltage optimum for a kind and a control mode of the memory card 15 can be controlled in accordance with a device kind recorded to the memory card 15.

Figure 4:
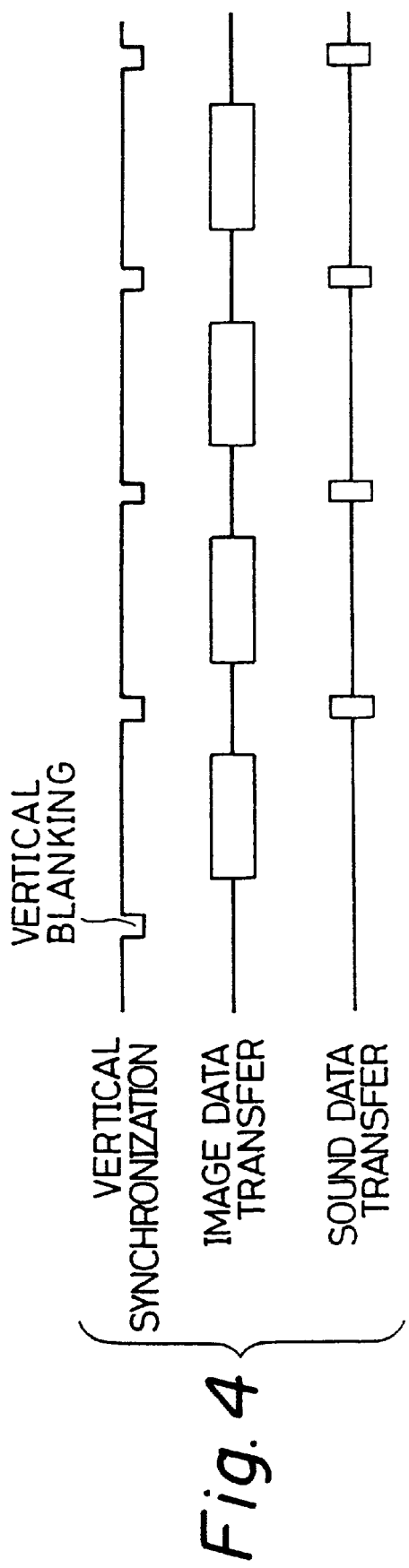
FIG. 4 is a timing chart of image and sound data DMA (direct memory access)-transferred through the memory card interface (I/F)

FIG. 4 is a timing chart of image and sound data DMA-transferred through the memory card I/F 14. At a photographing time, coded image data are transferred to the memory card 15 at a timing except for a vertical blanking period. Coded sound data are transferred to the memory card 15 for the vertical blanking period.

At a regenerating time, the coded image data are transferred from the memory card 15 to the FIFO circuit 13 at a timing except for the vertical blanking period. The coded sound data are transferred from the memory card 15 to the FIFO circuit 13 for the vertical blanking period. Thus, a file is easily controlled every field.

The capacity of an image region of the FIFO circuit 13 can be set to a capacity an integer times that of the coded image data for one field period or one frame period. In this case, data can be easily processed when these data are set to a file every one field or one frame. Accordingly, a continuous image can be recorded even when a memory card having a low writing speed is used. Further, no size of the camera is excessively increased so that the camera can be made compact and cheaply manufactured.

Further, the capacity of a sound region of the FIFO circuit 13 can be set to a capacity corresponding to the coded sound data for one field period or one frame period. In this case, the capacity of the FIFO circuit 13 can be optimized. Accordingly, similar to the above case, the camera can be made compact and cheaply manufactured.

As mentioned above, in accordance with each of first and fifth constructions of an electronic still camera in the present invention, image data and sound data are recorded and regenerated with respect to a memory card as a recording medium by a first-in first-out (FIFO) memory and a DMA (direct memory access)-transfer means. Accordingly, a data transfer time is reduced and a moving image and a sound can be recorded and regenerated in real time in comparison with a case in which the image data and the sound data are recorded and regenerated with respect to the memory card by using software.

In accordance with each of second and sixth constructions of the electronic still camera in the present invention, data within the FIFO memory are DMA-transferred for a period except for a vertical blanking period. Further, sound data are DMA-transferred for the vertical blanking period. Thus, the image and sound data are easily transferred in synchronization with each other. Further, a file can be easily controlled every field.

In accordance with a third construction of the present invention, a capacity of the FIFO memory for an image is set to a capacity an integer times that of the image data coded for one field period or one frame period. Accordingly, data can be easily processed when the data are set to a file every one field or one frame. Therefore, a continuous image can be recorded even when a memory card having a low writing speed is used. Further, no capacity of the FIFO memory is excessively increased so that the camera can be made compact and cost of the camera can be reduced.

In accordance with each of fourth and eighth constructions of the present invention, completion of the DMA-transfer by a predetermined number of data relative to an image or a sound is transmitted to control means for controlling each of operations of the constructional means of the camera by using an interruption signal. Accordingly, another control operation of the camera can be performed during the DMA-transfer so that performance of the camera can be improved.

In accordance with a seventh construction of the present invention, a capacity of the FIFO memory for a sound is set to a capacity corresponding to the sound data coded for one field period or one frame period. Accordingly, the capacity of the FIFO memory is set to a suitable value so that no capacity of the FIFO memory is excessively increased and the camera can be made compact and cost of the camera can be reduced.

In accordance with a ninth construction of the present invention, the electronic still camera is constructed such that an address bus and a data bus of a memory used as a work area are respectively common to an address bus and a data bus of a memory card interface (I/F). Accordingly, the number of pins of a control integrated circuit (IC) can be reduced so that a mounting area of the control integrated circuit can be reduced. Therefore, the camera can be made compact and cost of the camera can be reduced.

In accordance with a tenth construction of the present invention, control signals can be simultaneously outputted by setting one bus to a bus for reading and the other bus to a bus for writing in control of the common address and data buses. Accordingly, data can be transferred at one access time. Therefore, data can be transferred at a high speed between a work memory and the memory card as a recording medium so that it is optimum to transfer data in a file control region.

In accordance with an eleventh construction of the present invention, when an insertion/extraction detecting signal of the memory card, a busy signal of the memory card, or a signal indicative of a reduction in voltage of a battery of the memory card is detected, this detection is transmitted to control means by using an interruption signal. Therefore, it is not necessary for the control means to perform polling processing so that the control means can be devoted to another processing. When an obstacle is caused, measures for this obstacle can be rapidly taken so that a generating probability of defects such as data destruction, etc. within the memory card can be reduced.

In accordance with a twelfth construction of the present invention, when a wait signal is outputted from the memory card in a DMA-transfer mode, a pulse width of each of memory control signals for the DMA-transfer is extended for an outputting period of the wait signal. Accordingly, data can be normally transferred to a memory card on which a device having a low operating speed is mounted. In contrast to this, when no DMA-transfer mode is set, the weight signal is outputted to the control means. Therefore, an access operation can be normally performed even when the control means directly gets access to data of the memory card.

In accordance with a thirteenth construction of the present invention, the electronic still camera has common reading and writing registers for getting access to various kinds of memories such as a first-in first-out (FIFO) memory or a work memory seen from control means. Accordingly, when the control means gets access to these memories, no operations for incrementing and decrementing addresses are performed. Therefore, a program capacity can be reduced and a high speed access operation can be simultaneously performed. Further, these registers are arranged at continuous addresses so that data can be accessed between the memories by using only address incremental commands.

In accordance with a fourteenth construction of the present invention, the electronic still camera has a means for transferring 16 bit data to the memory card by exchanging high and low order bytes of these 16 bit data with each other when these data are transferred between the memory card and a control section of the camera. Accordingly, a program capacity for this exchange can be reduced and a processing speed of the electronic still camera can be increased. Further, the high and low order bytes can be exchanged by control means so that optimum control can be performed in accordance with a data kind.

In accordance with a fifteenth construction of the present invention, the electronic still camera has a register for storing address data outputted to the memory card. It is not necessary to increment an address outputted to the memory card every time data are read and written. Accordingly, a program capacity of a ROM in the control means can be reduced and a processing speed of the electronic still camera can be increased. When it is not necessary to increment an address, a functional selection can be made by the control means so that no problem is caused.

In accordance with a sixteenth construction of the present invention, the electronic still camera has a register for controlling operations of plural power sources providing outputs to the memory card. Registered contents of this register can be set from the control means by a kind and a control mode of the memory card. Accordingly, a voltage of each of the power sources optimum for the kind and the control mode of the memory card can be controlled in accordance with a device kind recorded to the memory card.

Figure 5:
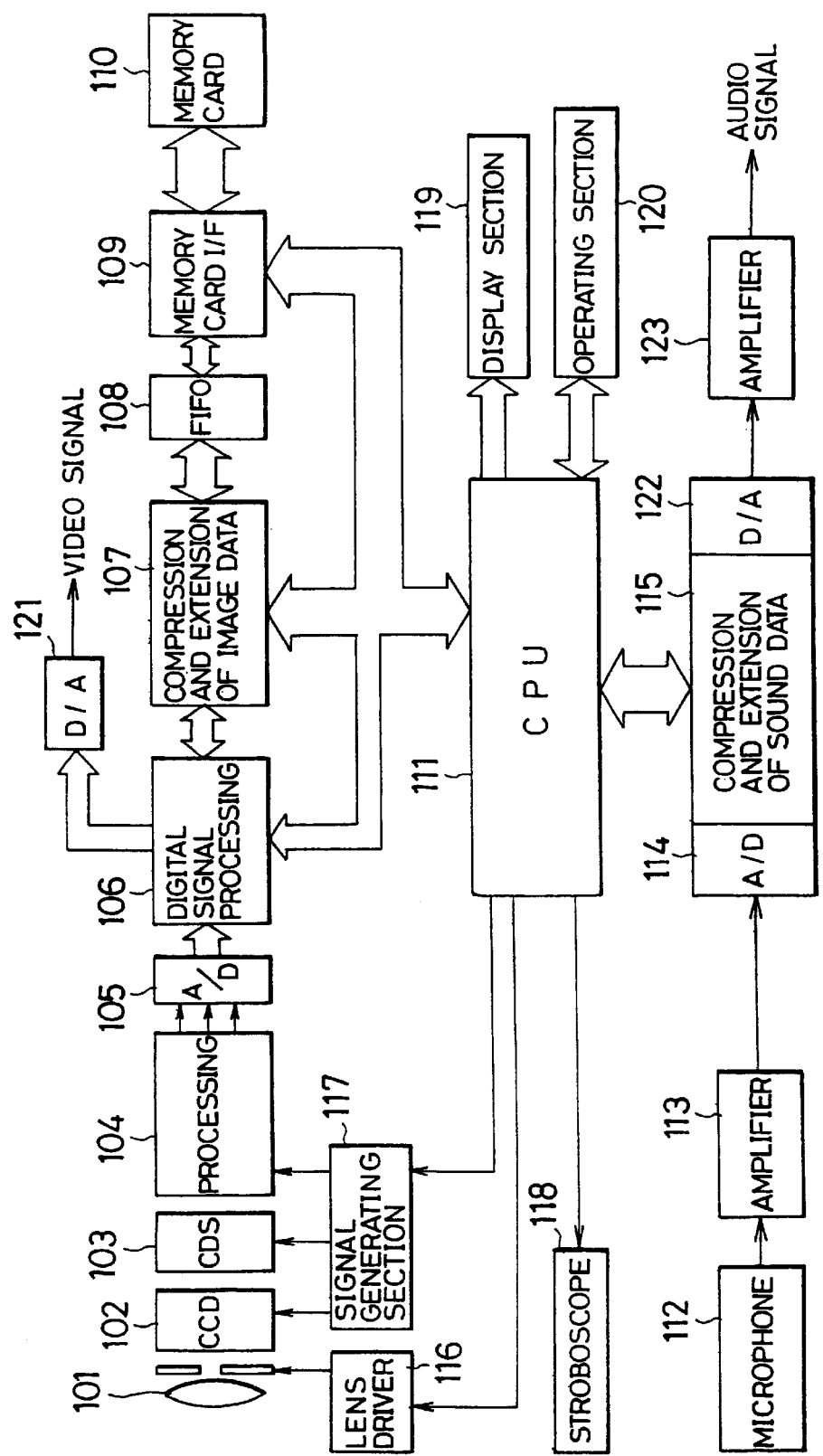
FIG. 5 is a block diagram showing the construction of an electronic still camera in accordance with another embodiment of the present invention.

FIG. 5 is a block diagram showing the construction of a digital electronic still camera in accordance with another embodiment of the present invention. A photographed image is focused and formed by an image pickup lens 101 as an image on a charge coupled device (CCD) 102 as an image pickup means. The charge coupled device (CCD) 102 outputs image data by photoelectric conversion based on the photographed image. The outputted image data are gain-controlled by a CDS 103 and a processing circuit 104 and are converted to digital image data by an A/D converter 105. A gamma correction and an aperture correction are made by a digital signal processing circuit 106 with respect to the digital image data. These image data are transmitted to an image data compression-extension circuit 107 as an image data coding means and an image data decoding means. The image data are coded by this image data compression-extension circuit 107. The coded image data are inputted to a first-in first-out (FIFO) circuit 108 and are transmitted to a memory card interface (I/F) 109. Thus, the image data are sequentially recorded to a memory card 110 as a recording medium by an unillustrated well-known data writing-reading means. An operation of each of the above constructional portions is controlled by a central processing unit (CPU) 111.

A sound at a photographing time is detected and converted to an electric signal by a microphone 112 as a sound converting means. This electric signal is amplified by an amplifier 113 and is converted to digital data by an A/D converter 114. The digital data are transmitted to a sound data compression-extension circuit 115 as a sound data coding means and a sound data decoding means. The digital data are coded by this sound data compression-extension circuit 115. The coded sound data are sequentially recorded to the memory card 110 by a recording means through the central processing unit (CPU) 111 and the memory card I/F 109.

In FIG. 5, a lens driver 116 controls diaphragming and drawing-out amounts of the image pickup lens 101, etc. A signal generating section 117 transmits a timing signal to each of the charge coupled device (CCD) 102, the CDS 103 and the processing circuit 104. A stroboscope 118 constitutes a means for illuminating a photographed object. A display section 119 displays various kinds of mode setting states, operating states, etc. An operating section 120 performs various kinds of inputting and setting operations, etc.

When data recorded to the memory card 110 are regenerated, image and sound data are read from the memory card 110 and are transmitted to the FIFO circuit 108 or the central processing unit (CPU) 111 through the memory card I/F 109. The image data are extended and decoded by the image data compression-extension circuit 107 and are outputted as a video signal through the digital signal processing circuit 108 and a D/A converter 121.

In contrast to this, the sound data are transmitted to the sound data compression-extension circuit 115 from the central processing unit (CPU) 111. The sound data are extended by this sound data compression-extension circuit 115 and are outputted as an audio signal through a D/A converter 122 and an amplifier 123.

Figure 6:
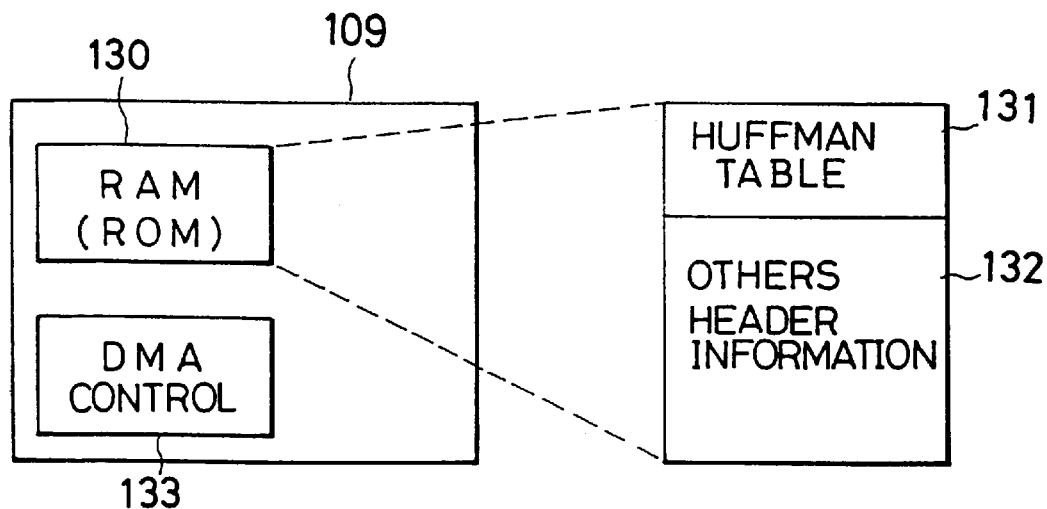
FIG. 6 is an explanatory view showing the construction of a memory card interface (I/F) shown in FIG. 5.

FIG. 6 is an explanatory view showing the construction of the memory card I/F 109 shown in FIG. 5. Header information 132 including a Huffman table 131 is recorded to a RAM or ROM 130. A direct memory access (DMA) control section 133 constitutes a direct memory transfer means.

The RAM 130 has header information, etc. recorded to a file header. When a power source of the electronic still camera is turned on, the header information including the Huffman table 131 recorded to an image file header is set up to the RAM 130 by the central processing unit (CPU) 111. The memory card I/F 109 records the header information within the RAM 130 to the memory card 110 by using the DMA control section 133 built in the memory card I/F 109 when an image is recorded to the memory card.

Figure 7:
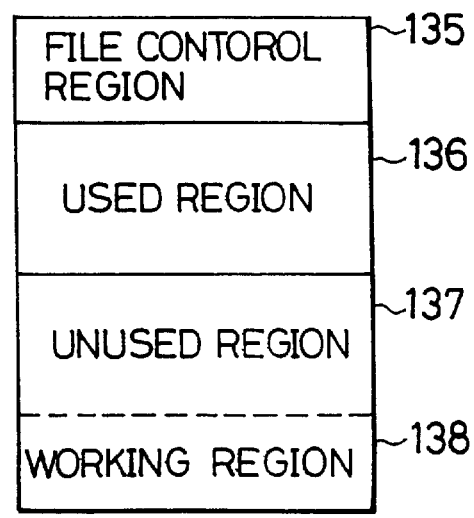
FIG. 7 is an explanatory view showing an internal detailed region of a memory card.

FIG. 7 is an explanatory view showing an internal detailed region of the memory card 110. The memory card 110 has a region 135 for controlling a file cluster and a region 136 for recording a file. A working region 138 is required when a recording system continuously records image and sound data to the memory card. A portion of an unused region 137 within the memory card 110 is used as the working region. When an operating mode is designated or a release switch is pushed, empty cluster information corresponding to a capacity of the image and sound data required to be recorded is retrieved and stored to this working region 138. At a data recording time, an image and a sound are continuously recorded to the memory card at a high speed by using these information in the working region.

Figure 8:
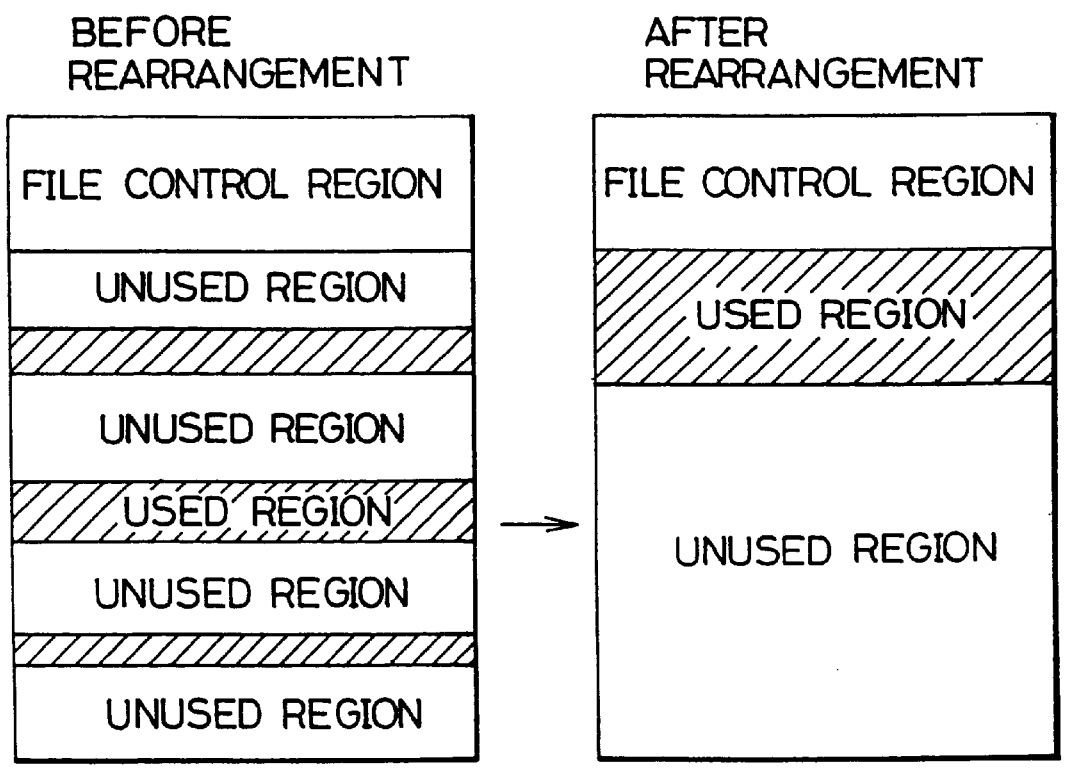
FIG. 8 is an explanatory view showing a rearrangement of the internal region of the memory card.

FIG. 8 is a view for explaining a rearrangement of an internal region of the memory card 110. When an image and a sound are recorded to the memory card 110 of a flash memory type, the image and the sound can be recorded to a continuous recording region at a higher speed in comparison with a case in which the image and the sound are recorded to another recording region. When an operating mode is designated or a release switch is pushed, this recording operation is secured by editing a recording region as shown in FIG. 8 when no continuous region corresponding to a capacity of image and sound data required to be recorded can be secured. However, when no recording region can be edited and rearranged, there is a case in which no data can be recorded to the memory card 110. In this case, the electronic still camera gives such contents to a user as an alarm by using the display section 119 shown in FIG. 5, etc.

Figure 9:
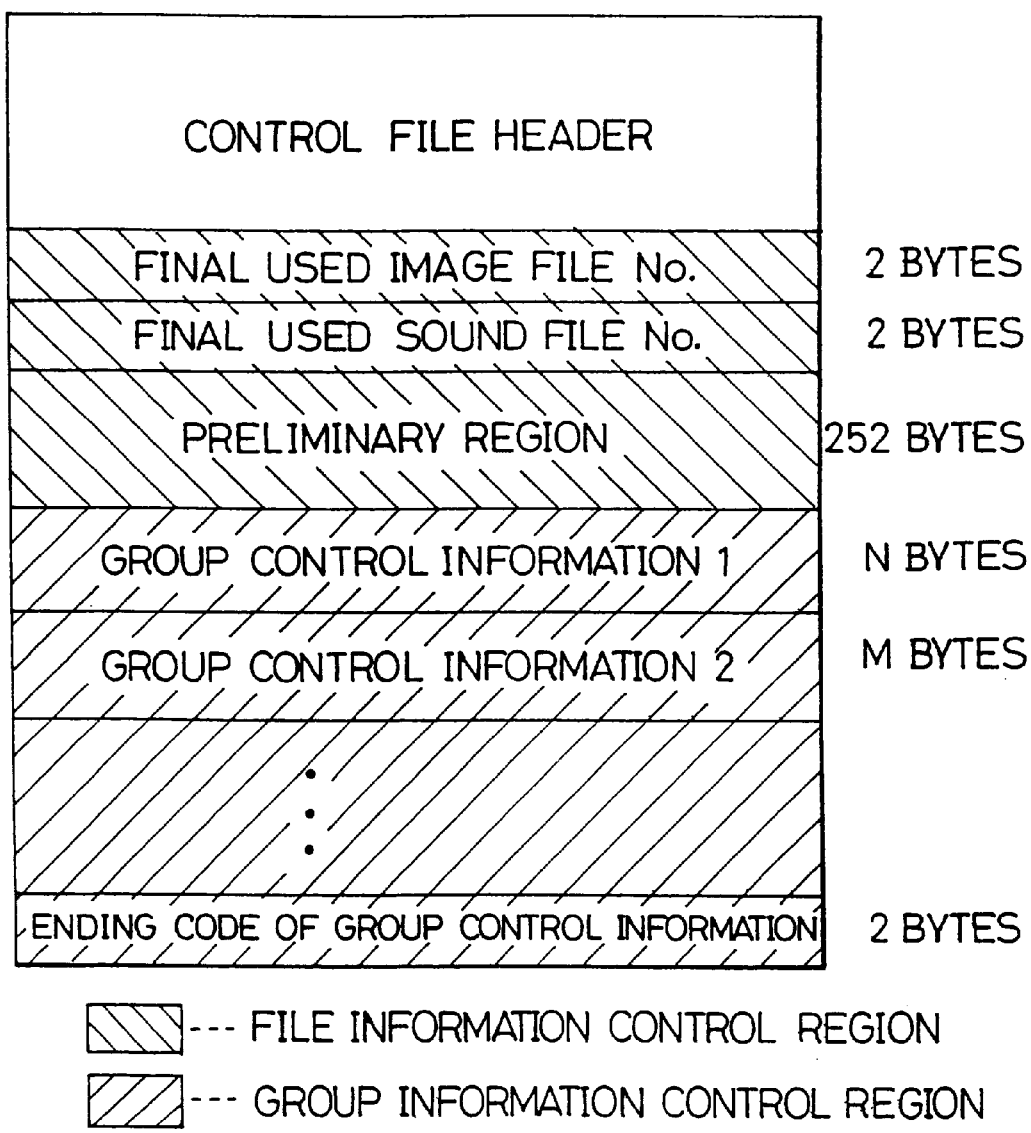
FIG. 9 is a view for explaining a control file structure.

FIG. 9 is a view for explaining a control information file structure. As shown by this control file structure, a control information file is controlled by using a directory entry number. Each of memory regions will next be explained in the following description.

(1) Control File Header Region

Addition of option codes

Control of control internal file number by file name: 0

Control of control internal file number by directory entry: 1

(The same system as a personal computer is used when there is no control file)

(2) File Information Control Region

00h: final image file number 0 to 65535

Final image file number recorded to a drive

Number "0" shows that there is no image file within a directory.

(It is not necessary to retrieve the same file name within the directory by recording this number)

02h: final sound file number 0 to 65535

Final sound file number recorded to a drive

Number "0" shows that there is no sound file within a directory.

(It is not necessary to retrieve the same file name within the directory by recording this number)

(3) Group Control Information

00h: starting mark of group control information

This starting mark shows beginning of a block of the group control information. Record "5555h"

02h: block size of group control information 28 to 65535 (bytes)

Size from the block starting mark to termination of an image file number (Simplify block search of a variable length)

04h: group control information number 1 to 65535

Sequentially name group control information number from 1.

06h: classification of group kinds

Group kinds are classified as follows.

| Still image | 01h |
| Sound | 02h |
| Still image + sound | 03h |
| Continuous image | 04h |
| Continuous image + sound | 05h |

Contents of still image file

There are the following three kinds of still image files.

| Still image 1 | frame (non-interlace) |
| Still image 2.1 | first field (interlace) |
| Still image 2.2 | second field (interlace) |

These files are discriminated from each other by an image file header.

Regeneration of Continuous Image

| The case of still image 1 | frame regeneration |
|---|---|

The case of still image 2.1—interlace and regenerate when the next image is a still image 2.2.
Regenerate field when the next image is a still image 2.1.
The case of still image 2.2—interlace and regenerate when the previous image is a still image 2.1.
Regenerate field when the next image is a still image 2.2.
08h: the number of image files
0 to 65535
The number of image files included in a group
0ah: the number of sound files
0 to 65535
The number of sound files included in a group
0ch to 0fh: interval time
Interval time of regeneration of an image file (hour, minute, second and 1/60 second)

| | |
|---|---|
| 0ch: hour | (0 to 99) |
| 0dh: minute | (0 to 59) |
| 0eh: second | (0 to 59) |
| 0fh: 1/60 second | (0 to 59) |

10h to 18h: subdirectory number
A number of a subdirectory to which image and sound files included in a group are recorded
10h: two stages
12h: three stages
14h: four stages
16h: five stages
(A retrieving speed of a file within the subdirectory is increased. The files within the group are set to be located within the same directory.)
A method for naming the subdirectory number will next be explained.

TABLE 1

| entry No. | | subdirectory No. |
|---|---|---|
| 1 | DSC001.J6I | 0 |
| 2 | DSC002.J6I | 0 |
| 3 | DSC003.J6I | 0 |
| 4 | DSC004.J6I | 0 |
| 5 | DSCSUB01 | 0 |
| 5-1 | DSC101.J6I | 5 |
| 5-2 | DSC102.J6I | 5 |
| 5-3 | DSCSUB02 | 5 |
| 5-3-1 | DSC201.J6I | 5-3 |
| 5-3-2 | DSC202.J6I | 5-3 |
| 5-3-3 | DSC203.J6I | 5-3 |
| 6 | DSC005.J6I | 0 |

(Rows 5-3-1, 5-3-2, 5-3-3 grouped as (A))

In the above table 1, subdirectory numbers are set as follows in the case of group (A).
10h: 5
12h: 3
14h: 0
16h: 0
All the subdirectory numbers are set to "0" in the case of a root directory.
1a to h: image-sound file number Set image files by the number of image files set in a place of "the number of image files" in a sequential regenerating order of an image file number.

After the image files are set, set sound files by the number of sound files set in a place of "the number of sound files" in a sequential regenerating order of a sound file number.

File number

This file number is an entry number within a directory set by a subdirectory number. No search of a file name is required and a data storing start cluster number can be rapidly confirmed.

The above contents are summarized as shown in the following table 2.

TABLE 2

| address | data | contents |
|---|---|---|
| 00h | 5555H | block starting mark |
| 02h | 28~65535 | block size |
| 04h | 1~65535 | group control No. |
| 06h | 1~5 | group kind |
| 08h | 0~65535 | the number of image files |
| 0ah | 0~65535 | the number of sound files |
| 0ch | 0~99 | interval time (hour) |
| 0dh | 0~59 | interval time (minute) |
| 0eh | 0~59 | interval time (second) |
| 0fh | 0~59 | interval time (1/60 second) |
| 10h | ¥SUB | subdirectory No. |
| \| | | (until five hierarchies) |
| 18h | | |
| 1ah | 0 to directory MAX | image-sound file No. |
| \| | | |
| NNh | directory MAX | 画像・音声ファイル No. |

(4) Final Code in Group Control Information Region

This final code shows the final of a group control information region.

"ffffh" is recorded.

A concrete constructional example is shown below.

Directory contents of a memory card

TABLE 3

| entry No. | | subdirectory No. |
|---|---|---|
| 1 | DSC001.J6I | 0 |
| 2 | DSC002.J6I | 0 |
| 3 | DSC003.J6I | 0 |
| 4 | DSC004.J6I | 0 |
| 5 | DSCSUB01 | 0 |
| 5-1 | DSC006.J6I | 5 |
| 5-2 | DSC001.J6S | 5 |
| 5-3 | DSCSUB02 | 5 |
| 5-3-1 | DSC007.J6I | 5-3 |
| 5-3-2 | DSC008.J6I | 5-3 |
| 5-3-3 | DSC009.J6I | 5-3 |
| 5-3-4 | DSC010.J6I | 5-3 |
| 5-3-5 | DSC002.J6S | 5-3 |
| 6 | DSC005.J6I | 0 |

TABLE 4

| Data information of control file | | |
|---|---|---|
| 10 | final image file No. | file information region |
| 2 | final sound file No. | |
| (252 bytes preliminary region) | | |
| 5555h | group control information starting mark | file control information 1 |
| 34 | group control information block size | |
| 1 | group control information No. | |
| 4 | group kind (continuous image) | |
| 4 | the number of image files | |
| 0 | the number of sound files | |
| 0,0,0,10 | interval time | |
| 0,0,0,0 | subdirectory No. | |
| 1 | image file No. 1 | |
| 2 | image file No. 2 | |
| 3 | image file No. 3 | |
| 4 | image file No. 4 | |
| 5555h | group control information starting mark | file control information 2 |
| 28 | group control information block size | |
| 2 | group control information No. | |
| 1 | group kind (still image) | |
| 1 | the number of image files | |
| 0 | the number of sound files | |
| 0,0,0,0 | interval time | |
| 0,0,0,0 | subdirectory No. | |
| 6 | image file No. 1 | |
| 5555h | group control information starting mark | file control information 3 |
| 30 | group control information block size | |
| 3 | group control information No. | |
| 3 | group kind (still image + sound) | |
| 1 | the number of image files | |
| 1 | the number of sound files | |
| 0,0,0,0 | interval time | |
| 0,0,0,0 | subdirectory No. | |
| 1 | image file No. | |
| 2 | sound file No. | |
| 5555h | group control information starting mark | file control information 4 |
| 36 | group control information block size | |
| 4 | group control information No. | |
| 5 | group kind (continuous image + sound) | |
| 4 | the number of image files | |
| 1 | the number of sound files | |
| 0,0,1,0 | interval time | |
| 5,3,0,0 | subdirectory No. | |
| 1 | image file No. 1 | |
| 2 | image file No. 2 | |
| 3 | image file No. 3 | |
| 4 | image file No. 4 | |
| 5 | sound file No. 1 | |
| ffffh | final code in group control information region | |

In an image file, a Huffman table is stored to a file header. The Huffman table recorded to the image file is not constructed by a Huffman tree, but is constructed by only a table showing the number of information of some bits for generating this Huffman tree, and coding elements arranged in a generating frequency order.

Therefore, when an image is regenerated, it is necessary to develop the Huffman table tree from the Huffman table. When Huffman tables are different from each other every image file, a developing time is required so that no image can be regenerated at a high speed. In this case, an alarm is given by using the display section 119 shown in FIG. 5, etc. It is also considered that a developed Huffman table is made before the image regeneration by using an unused region of the memory card 110.

As mentioned above, in an electronic still camera having a seventeenth construction of the present invention, file header information is recorded to a recording medium by using a direct memory transfer means when image data and sound data are recorded to the recording medium as a file. Therefore, a processing time of these data is reduced and a moving image can be recorded to the recording medium in real time in comparison with a case in which these data are written to the recording medium by a central processing unit (CPU) by using software.

In accordance with an eighteenth construction of the present invention, a moving image can be recorded to the recording medium in real time by using a Huffman table even when the image data are set to a JPEG file.

In accordance with a nineteenth construction of the present invention, a file is controlled by using a directory entry number instead of a file name so that a retrieving time is reduced and an image can be regenerated in real time.

In accordance with a twentieth construction of the present invention, an unused region of the recording medium is used as a work area for a file control work. Accordingly, it is not necessary to arrange a memory having a large capacity within the electronic still camera so that the camera can be made compact and cost of the camera can be reduced.

In accordance with a twenty-first construction of the present invention, it is not necessary to record data while empty of a cluster is retrieved in a recording region. Accordingly, a moving image can be recorded to the recording medium in real time.

In accordance with a twenty-second construction of the present invention, data within the recording medium can be rearranged to secure a continuous cluster so that execution efficiency of an operating system is improved.

In accordance with a twenty-third construction of the present invention, an alarm is given to a user when there is no continuous cluster. Accordingly, it is possible to prevent errors in recognition and use.

In accordance with a twenty-fourth construction of the present invention, an alarm is given to a user when no Huffman tables are equal to each other at a regenerating time of a continuous file. Accordingly, it is possible to prevent errors in recognition and use.

In accordance with a twenty-fifth construction of the present invention, when no Huffman tables are equal to each other at a regenerating time of a continuous file, a Huffman table developed prior to the regeneration can be made in advance in an unused region of the recording medium so that data can be regenerated in real time.

Figure 10:
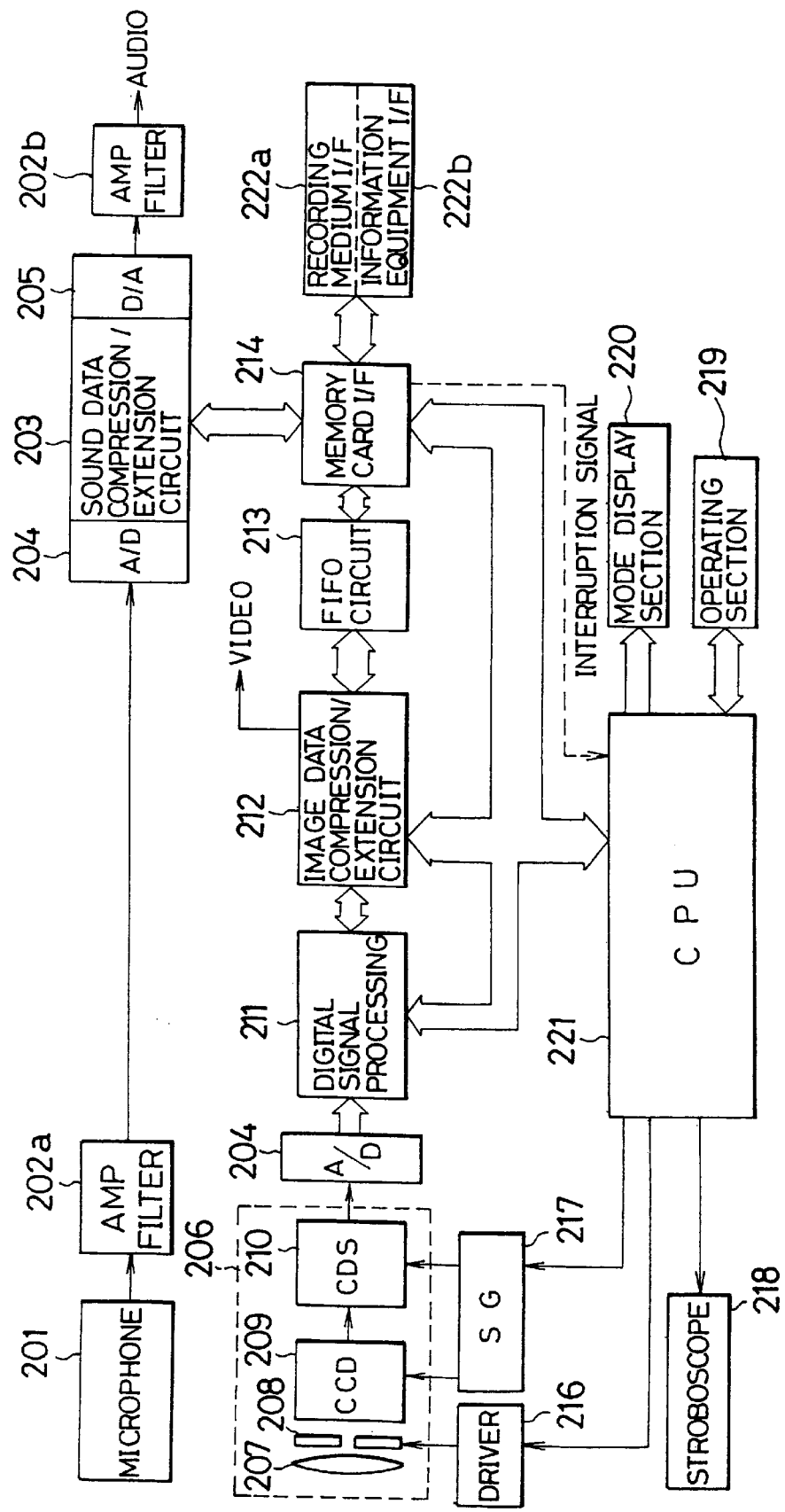
FIG. 10 is a block diagram showing the construction of an electronic still camera in accordance with another embodiment of the present invention.

FIG. 10 is a block diagram showing the construction of an electronic still camera in accordance with another embodiment of the present invention. Reference numerals 201, 202a and 202b respectively designate a microphone, an amplifier and an amplifier. A sound data compression/extension circuit 203 constitutes a sound data coding means and a sound data decoding means for respectively coding and decoding sound data. Reference numerals 204 and 205 respectively designate an analog/digital (A/D) converting circuit and a digital/analog (D/A) converting circuit.

An image pickup section 206 of the camera is constructed by an image pickup lens 207, a diaphragm 208, a charge coupled device (CCD) 209 and a CDS 210 as a camera control section, etc. A digital signal processing circuit 211 performs various kinds of image processings. An image data compression/extension circuit 212 constitutes an image data coding means and an image data decoding means for respectively coding and decoding image data. Reference numerals 213 and 214 respectively designate a first-in first-out (FIFO) circuit and a memory card interface (I/F) with a memory card 215.

A driver 216 constitutes a driving section of a mechanical system of the camera image pickup section 206. Reference numerals 217, 218 and 219 respectively designate a timing signal generating section (SG) of an electric system of the camera image pickup section 206, a stroboscope as an illuminating means, and an operating section for setting various kinds of operating modes. A mode display section 220 displays a set mode. A central processing unit (CPU) 221 controls an operation of each of the above constructional portions.

A recording medium interface (I/F) 222a and an information equipment interface (I/F) 222b are connected to the memory card I/F 214. The recording medium I/F 222a is an interface with various kinds of recording media. The information equipment I/F 222b is an interface with various kinds of information equipments.

In FIG. 10, a photographed image is focused and formed by the image pickup lens 207 as an image on the charge coupled device (CCD) 209 as an image pickup means. The image formed by the charge coupled device (CCD) 209 is gain-controlled by the CDS 210 and is converted to digital data by the A/D converting circuit 204. A gamma correction and an aperture correction are made by the digital signal processing circuit 211 with respect to the digital image data. The corrected image data are transmitted to the image data compression/extension circuit 212 as an image signal coding means and are coded by this image data compression/extension circuit 212. The digital signal processing circuit 211 has a circuit capable of changing a pixel aspect ratio by a setting operation of the central processing unit (CPU) 221.

The aspect ratio of an NTSC image is set to "1" by a vertical pixel interpolation using the following concrete method.

In the following description, a(i,k) is set to a pixel before the aspect ratio is changed. b(i,k) is set to a pixel after the aspect ratio is changed.

In this case, the following formula is formed.

$$m=(i/6)+1$$

When $1 \leq i\ 575$ and $1 \leq k \leq 768$ are set and m is set to an integer, the following formula is formed.

$$b(i,k)=\{(5+i-6m)/6\} \times a(i-m,k)+\{(1-i+6m)/6\} \times a\{(i-m+1),k\}$$

In this formula, a(0,k)=0 is set.

The coded image data are inputted to the FIFO circuit 213 and are sequentially recorded to the memory card as a recording medium through the memory card I/F 214. Operations of the above constructional portions are controlled by the central processing unit (CPU) 221.

A sound is detected by the microphone 201 and is converted to an electric signal. This electric signal is amplified by the amplifier 202a and is converted to digital data by the A/D converting circuit 204. These digital data are transmitted to the sound data compression/extension circuit 203 as a sound signal coding means and are coded by this sound data compression/extension circuit 203. The coded sound data are recorded to the memory card through the central processing unit (CPU) 221 and the memory card I/F 214. Some files of formats recorded to the memory card can be made by changing headers set from the central processing unit (CPU) 221 at a file making time. Detailed contents of operations for making these files will be explained later with reference to FIG. 11.

When data recorded to the memory card are regenerated, image and sound data are transmitted to the FIFO circuit 213 or the central processing unit (CPU) 221 through the memory card I/F 214. The image data are extended and decoded by the image data compression/extension circuit 212 and are outputted as a video signal through the digital signal processing circuit 211.

In contrast to this, the sound data are transmitted to the sound data compression/extension circuit 203 through the central processing unit (CPU) 221. The sound data are extended and decoded by the sound data compression/extension circuit 203 and are outputted as an audio signal through the amplifier 202b.

The recording medium I/F 222a is commonly used to directly transfer data between the electronic still camera and an information equipment. When incompressible image data are transferred to the information equipment, a gamma correction and an aperture correction are made by the digital signal processing circuit 211 with respect to the image data. The corrected image data are outputted to the image data compression/extension circuit 212 and are written to the FIFO circuit 213 from the image data compression/extension circuit 212 as they are. The image data written to the FIFO circuit 213 are outputted to the information equipment I/F 222b through the memory card I/F 214. When incompressible sound data are transferred to the information equipment, the sound data are digitized by the A/D converting circuit 204 and are inputted to the sound data compression/extension circuit 203 and are outputted from this sound data compression/extension circuit 203 as they are. The sound data are then written to the FIFO circuit 213. The sound data written to the FIFO circuit 213 are outputted to the information equipment I/F 222b through the memory card I/F 214.

Each of FIGS. 12a and 12b is a timing chart of data transferred to the information equipment. Image data outputted from the digital signal processing circuit 211 are outputted to the information equipment I/F 222b for an image effective period as they are. A coded vertical synchronous code showing vertical blanking, a coded status code showing a status of the camera, a control code showing control commands on a side of the information equipment, and a code showing a field number or a frame number are inserted and recorded to the information equipment for a vertical blanking period in addition to sound data.

Further, a coded horizontal synchronous code showing horizontal blanking, a coded status code showing a status of the camera, a control code showing control commands on a side of the information equipment, and a code showing a horizontal scanning line number are inserted and recorded to the information equipment for a horizontal blanking period in addition to the sound data.

Figure 11:
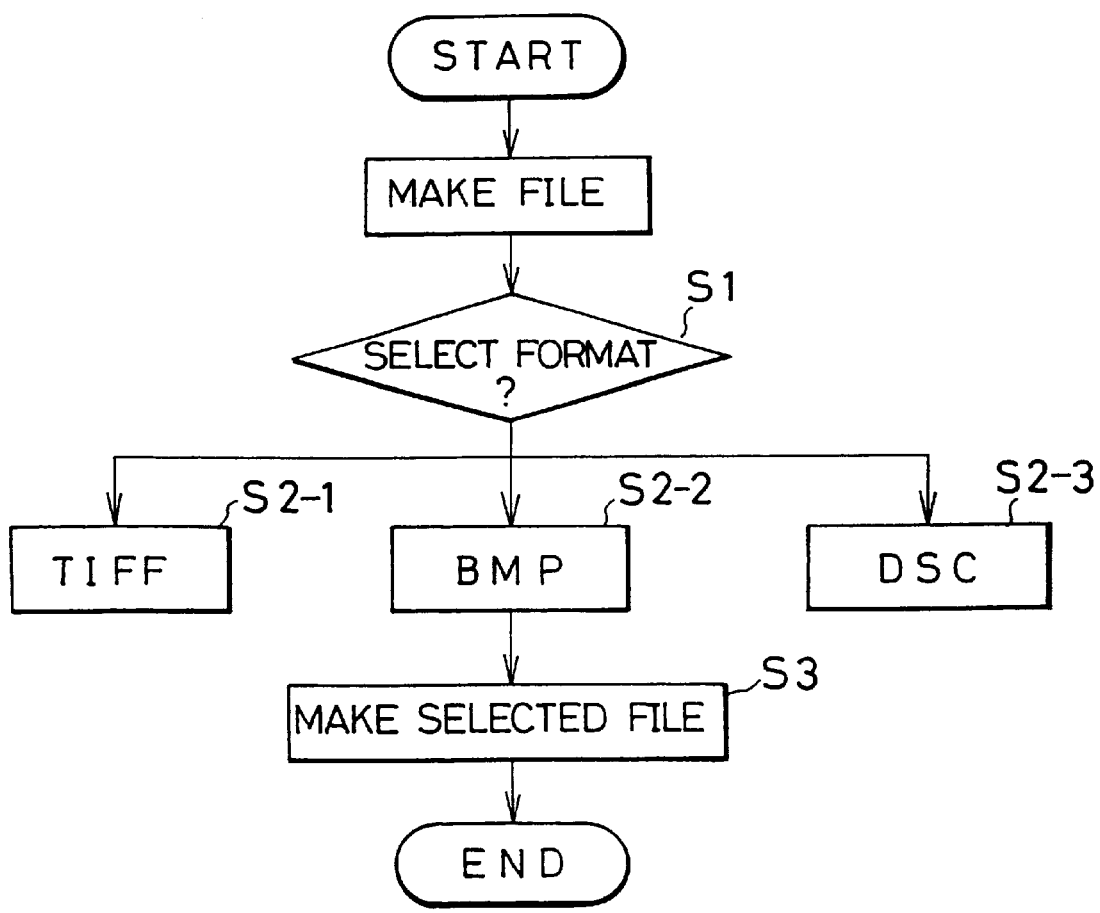

FIG. 11 shows a file making flow in this embodiment. When a file is made, a format specification to be made is first set or selected from the operating section 219 in the central processing unit (CPU) 221 in a step S1. When image data are transferred to the memory card, the central processing unit (CPU) 221 combines header information according to each of selected file formats (S2-1, S2-2 and S2-3) with the image data. The central processing unit (CPU) 221 then transfers the combined data to the memory card so that a file is made in a step S3.

As mentioned above, in accordance with a twenty-sixth construction of the present invention, an electronic still camera has means for selecting an image or sound format recorded to a memory card as a recording medium. Accordingly, when these formats are used in various kinds of application programs in an information equipment, no file conversion is required if data are recorded by the electronic still camera in accordance with the image and sound formats. Accordingly, adaptability (or affinity) between the electronic still camera and the information equipment is further improved.

In accordance with a twenty-seventh construction of the present invention, the electronic still camera has means for changing a pixel aspect ratio of the image data recorded to the recording medium. Accordingly, when this aspect ratio is used in various kinds of application programs in the information equipment. no aspect conversion is required if data are recorded by the electronic still camera in accordance with the pixel aspect ratio. Accordingly, effects similar to those of the twenty-sixth construction can be obtained.

In accordance with a twenty-eighth construction of the present invention, the electronic still camera has means for transferring incompressible image data to a recording medium interface section, and means for generating a code showing image synchronization and inserting this code into the incompressible image data. Accordingly, a synchronous position of the image data is known so that the image data are normally displayed on a side of the information equipment.

In accordance with a twenty-ninth construction of the present invention, the incompressible image data transfer means has means for inserting sound data compressed in a time axis direction into the incompressible image data for an image blanking period. Accordingly, the sound data can be also transferred in real time so that a real place feeling of the sound data is obtained on the information equipment side at a regenerating time.

In accordance with a thirtieth construction of the present invention, the incompressible image data transfer means has means for generating and inserting a code showing a field number or a frame number of an image into the incompressible image data for the image blanking period. Accordingly, when an error in data transfer is caused, these data can be normally displayed immediately after this error is recovered.

In accordance with a thirty-first construction of the present invention, the incompressible image data transfer means has means for generating and inserting status information and control commands transmitted to a device connected to a recording medium interface into the incompressible image data for the image blanking period. The status information can be monitored on an information equipment side and an operation of the information equipment can be controlled.

In accordance with a thirty-second construction of the present invention, a transmitted data bus width is constructed by 18 bits composed of 8 bits for a brightness signal and the remaining 8 bits for a subsampled color difference signal. Accordingly, image data can be efficiently transmitted.

In accordance with a thirty-third construction of the present invention, a transmitted data bus width is constructed by 16 bits composed of N bits for image data and the remaining (16−N) bits for sound data where N is a positive integer. Accordingly, sound and image data can be transferred in real time.

Many widely different embodiments of the present invention may be constructed without departing from the spirit and scope of the present invention. It should be understood that the present invention is not limited to the specific embodiments described in the specification, except as defined in the appended claims.

What is claimed is:

1. An electronic still camera comprising:
    photographing means for photographing a photographed object and outputting image data;
    image data coding means for coding the image data;
    means for recording the coded image data to a recording medium;
    means for converting a sound to an electric signal;
    means for coding sound data converted to the electric signal; and
    means for recording the coded sound data to the recording medium;
    a rearrangeable unused region of the recording medium being used as a work area for a file control work.

2. An electronic camera as claimed in claim 1, wherein empty cluster information corresponding to a capacity of the image and sound data to be recorded is stored to the work area for the file control work in the recording medium when a recording mode is set or a release switch is pushed.

3. An electronic camera as claimed in claim 2, wherein internal data of the recording medium are rearranged such that a continuous required cluster can be secured when no continuous cluster corresponding to a capacity of continuous image and sound data to be recorded can be secured.

4. An electronic camera as claimed in claim 22, wherein, when no internal data of the recording medium can be rearranged, such contents are alarmed.

5. An electronic camera comprising:
    an image pickup unit configured to photograph a photographed objected and to output image data;
    an image data coder configured to code the image data;
    a recording unit configured to record the coded image data to a recording medium;
    a sound converter configured to convert an input sound to an electric signal;
    a second coder configured to code the sound data converted to the electric signal; and
    wherein the recording unit further is configured to record the coded sound data to the recording medium; and
    wherein a rearrangeable unused region of the recording medium is used as a work area for a file control work.

6. An electronic camera as claimed in claim 5, wherein empty cluster information corresponding to a capacity of the image and sound data to be recorded is stored to the work area for the file control work in the recording medium when a recording mode is set or a release switch is pushed.

7. An electronic camera as claimed in claim 6, wherein internal data of the recording medium are rearranged such that a continuous required cluster can be secured when no continuous cluster corresponding to a capacity of continuous image and sound data to be recorded can be secured.

8. An electronic camera as claimed in claim 7, wherein, when no internal data of the recording medium can be rearranged, such contents are alarmed.

9. A method of controlling an electronic camera comprising the steps of:
    photographing a photographed object and outputting image data;
    coding the image data;
    recording the coded image data to a recording medium;

converting input sound data to an electric signal;

coding the sound data converted to the electric signal; and recording the coded sound data to the recording medium;

wherein a rearrangeable unused region of the recording medium is used as a work area for a file control work.

10. A method of controlling an electronic still camera as claimed in claim 9, further comprising the step of storing empty cluster information corresponding to a capacity of the image and sound data to be recorded to the work area for the file control work in the recording medium when a recording mode is set or a release switch is pushed.

11. A method of controlling an electronic still camera as claimed in claim 9, further comprising the step of rearranging internal data of the recording medium such that a continuous required cluster can be secured when no continuous cluster corresponding to a capacity of continuous image and sound data to be recorded can be secured.

12. A method of controlling an electronic still camera as claimed in claim 11, wherein in the rearranging step, when no internal data of the recording medium can be rearranged, such contents are alarmed.

* * * * *

UNITED STATES PATENT AND TRADEMARK OFFICE
CERTIFICATE OF CORRECTION

PATENT NO. : 6,334,027 B1  
DATED : December 25, 2001  
INVENTOR(S) : Fukuoka et al.

Page 1 of 1

It is certified that error appears in the above-identified patent and that said Letters Patent is hereby corrected as shown below:

<u>Title page,</u>
Item [30], the Foreign Application Priority information should read:

[30]  Foreign Application Priority Data
Aug. 9, 1993  (JP) .............................. 5-197249
Nov. 29, 1993  (JP) ............................ 5-298170
Dec. 29, 1993  (JP) ............................ 5-351986

Signed and Sealed this

Thirtieth Day of April, 2002

Attest:

Attesting Officer

JAMES E. ROGAN
*Director of the United States Patent and Trademark Office*